(12) United States Patent  
Turner

(10) Patent No.: US 8,703,227 B2  
(45) Date of Patent: Apr. 22, 2014

(54) METHOD OF STABILIZING A SCORPION FOR STORAGE AND DISTRIBUTION IN A NOVELTY DRINK FORM

(76) Inventor: Kenneth Turner, Hartland, WI (US)

( * ) Notice: Subject to any disclaimer, the term of this patent is extended or adjusted under 35 U.S.C. 154(b) by 164 days.

(21) Appl. No.: 13/108,336

(22) Filed: May 16, 2011

(65) Prior Publication Data

US 2012/0003370 A1     Jan. 5, 2012

Related U.S. Application Data

(60) Provisional application No. 61/359,953, filed on Jun. 30, 2010.

(51) Int. Cl.
    *A23L 2/38*      (2006.01)
    *A23L 2/42*      (2006.01)

(52) U.S. Cl.
    USPC .......................... 426/590; 426/330.3; 426/324

(58) Field of Classification Search
    USPC ............................. 426/321, 324, 330.3, 590
    See application file for complete search history.

(56) References Cited

U.S. PATENT DOCUMENTS

2002/0160095 A1    10/2002   French
2007/0065561 A1*   3/2007   Livaich .......................... 426/599

FOREIGN PATENT DOCUMENTS

CN      1125581 A   *   7/1996
CN      101113391 A   *   1/2008
JP      04262767 A   *   9/1992

* cited by examiner

*Primary Examiner* — Jyoti Chawla

(74) *Attorney, Agent, or Firm* — Daniel Boudwin; Global Intellectual Property Agency LLC

(57) ABSTRACT

A method of preserving and preparing a novelty drink is disclosed, comprising a container of non-alcoholic, flavored syrup preservative and an edible scorpion for consumption. Several ounces of a preservative syrup are placed in the bottom of a container that houses a prepared scorpion carcass prior to shipment or storage. The syrup preserves the scorpion by preventing decomposition, and then acts as a mixer for an alcoholic or non-alcoholic beverage to provide a novelty drink in which the scorpion is suspended within the drink. The syrup doubles as a food preservative and tasteful drink mixer. The scorpion is cooked, cleaned and devenomized prior to being mixed into the preservative syrup and presented to a consumer.

6 Claims, No Drawings

METHOD OF STABILIZING A SCORPION FOR STORAGE AND DISTRIBUTION IN A NOVELTY DRINK FORM

CROSS REFERENCE TO RELATED APPLICATION

This application claims the benefit of U.S. Provisional Application No. 61/359,953 filed on Jun. 30, 2010, entitled "Scorpion Shot."

BACKGROUND OF THE INVENTION

1. Field of the Invention

The present invention relates to novelty alcoholic and non-alcoholic beverages involving suspended exotic insects, particularly those insects that are safely edible. More specifically, the present invention pertains to a method of preserving a scorpion within a fluid preservative container for shipment, storage and later consumption. The container houses the scorpion, in which the scorpion has been cooked and devenomized for human consumption, along with a volume of syrup that envelops the scorpion carcass. The syrup provides two key functions. The first is a preservative function in which the scorpion is protected from decomposition and contamination that may cause spoilage. The second function of the syrup is to act as a drink mixer as the scorpion is prepared in an alcoholic or nonalcoholic beverage and served to consumers. The scorpion is adequately prepared prior to being placed into the syrup in a way that the carcass will remain intact, will not emit a contaminant slurry into the syrup and is no longer a poison risk to humans.

2. Description of the Prior Art

Scorpions and other insects are a well known and popular source of protein around many parts of the world. They are considered a delicacy in many countries and served in a variety of fashions and recipes. These include different cooking and preparation methods for formal platters and entries. The present invention contemplates the consumption of a scorpion in a novelty drink form, wherein a scorpion is suspended in a mixture of alcoholic or non-alcoholic fluid. The present invention provides a preserved and edible scorpion, readily mixable with alcohol or other mixer to provide a beverage for consumers. The scorpion is prepared in a fashion that it poses no health risk if consumed, either swallowed with the beverage or consumed thereafter once the beverage is finished.

Preparation of scorpions and other edible insects, particularly venomous varieties thereof, must be meticulously prepared prior to consumption. Typical preparation of scorpions includes removal of the insect's venom gland located in the tail section, and thoroughly cooking and cleaning the remaining carcass. Unwanted internals are removed from the carcass, and the remaining structure is boiled for a predetermined period of time to thoroughly cook its internal meat. Once it has been cooked, the scorpion is typically placed in a cleansing bath to remove dirt, molted shell scaling and byproducts from the surface of the insect's exoskeleton. This is generally accomplished with an alcohol bath, in which the scorpion is submerged within the alcohol. The alcohol bath is then inspected for clarity thereafter. If the alcohol exhibits discoloration or floating debris, the scorpion is removed and placed in a further alcohol bath, and so on until the mixture is clear and with no floating debris from the scorpion shell. This process thoroughly cleans and further neutralizes any residual venom within the scorpion, while cleaning the shell for consumption if desired. This cleansing process has been approved by the Food and Drug Administration for preparing a scorpion carcass for human consumption.

After cooking and cleansing the scorpion, it is shipped to providers and customers for sale and distribution. This process involves packaging and transporting the scorpion in a dry food container. This method of shipping can be problematic, as the scorpion freshness degrades over time when placed in a dry container. After an extended period of time in dry storage, the scorpion can dry out or begin to decompose, reducing freshness and increasing the chance of liberated shell debris when placed into a liquid beverage. An improved method of preparation and shipment is described herein, one that preserves the scorpion carcass during transit and subsequent storage prior to consumption.

Methods and compounds have been disclosed in the prior art for preserving food and body tissue for periods of time to prevent rotting and fungi development. However, these are generally for preserving non-edible items for scientific or medical reasons. U.S. Published Patent Application 2002/0160095 to French discloses a method of preparing an edible scorpion prior to consumption, comprising the steps of boiling the carcass and rinsing the cooked carcass in an alcohol bath until clean. The method is primarily related to preparation of an uncooked scorpion prior to packaging and distribution, as opposed to the present method of preserving a cooked and cleaned scorpion for periods of time prior to consumption. The disclosed invention is utilized after the steps described in the French application, which is a well known method for preparation of scorpion carcasses for consumption.

Therefore, the disclosed invention is an improved method of shipping an edible scorpion after proper preparation that allows human consumption thereof. The scorpion is suspended within a preservative syrup that provides a storage medium, as well as a base for a flavored, novelty drink. The syrup provides a stable environment for the scorpion to be stored for extended periods of time, allowing long distance shipping and extended shelf life for the novelty item and safe consumption thereafter. The ingredients of the syrup may be altered to change its appearance and taste, but its primarily source of novelty is the use of a fluid medium to preserve the scorpion quality over long periods of time. This method substantially diverges in steps and elements from the prior art and it is consequently clear that a need has arrived in the art for an improvement to existing methods of shipping and storing a scorpion or similar insect for later use within a novelty drink. In this regard the instant invention fulfills these needs.

SUMMARY OF THE INVENTION

In view of the foregoing disadvantages inherent in the known types of novelty drink storage and preparation methods now present in the prior art, the present invention provides a new method of preserving a suspended scorpion carcass within a volume of syrup preservative wherein the same can be utilized for providing convenience for the user when storing an edible scorpion within a container for extended periods of time and shipping over long distances without spoilage.

It is therefore an object of the present invention to provide a method of shipping and storing a novelty scorpion drink mixer, including placement of a prepared scorpion carcass within a volume of preservative syrup that envelops the scorpion and prevents spoilage over long durations.

Another object of the present invention is to provide method of shipping and storing a novelty scorpion drink mixer that allows unrefrigerated containment of the scorpion for over 12 months without loss of freshness or spoilage.

Yet another object of the present invention is to provide a method of preserving a scorpion within a fluid container, wherein the fluid is a preservative syrup that can embody several different flavors and colors, mixable with different alcoholic and non-alcoholic mixers.

A final object of the present invention to provide a new and improved novelty scorpion drink mixer storage method that has all of the advantages of the prior art and none of the disadvantages.

Other objects, features and advantages of the present invention will become apparent from the following detailed description taken in conjunction with the accompanying drawings.

DETAILED DESCRIPTION OF THE INVENTION

A method for preserving a cooked and edibly prepared scorpion for distribution and storage includes the steps of retaining a fluid container of sufficient volume to house a desired scorpion carcass along with a fluid volume to immerse the scorpion. The scorpion is then placed in the container and submerged in preservative syrup. The syrup is a sodium benzoate mixture with a food coloring and flavoring that provides a drink mixer for the user to prepare a novelty drink within the same fluid container or within a larger container. The syrup provides preservative function, as well as a means to alter the taste of the drink based on end user preferences and choice of alcoholic or non-alcoholic mixer. The food coloring provides an ornamental feature that can be used to highlight scorpions with different color exoskeletons. For instance, a dark colored scorpion may be housed in a lighter colored syrup, while a specific flavor of syrup may be directed to be used with a particular type of alcohol. In this way, the scorpion drink can be altered to suit different preferences and desires.

The active ingredient within the syrup, sodium benzoate, is a common food preservative that is bacteriostatic and fungistatic under acidic conditions, working to absorb benzoic acid when the pH balance of the fluid mixture is less than 3.6. Anaerobic fermentation of glucose through phosphofructokinase is drastically reduced, preserving the scorpion within the fluid for long periods of time without refrigeration or further diligence. This preservative syrup has been shown to preserve a scorpion carcass without refrigeration in excess of twelve months without loss of freshness or discoloration of the fluid.

The preservative, flavor and visual properties of the syrup are of primary utility. A user may purchase and store the scorpions within the fluid container for extended periods of time prior to use, allowing time for customers to notice and try the unique mixture, or provide an interesting visual for customers to direct questions. Likewise, the composition may be packaged and shipped over long distanced without refrigeration or concern over scorpion freshness. When prepared for consumption, the scorpion and syrup mixture may be mixed with another liquid, such as an alcohol or soda in a large mix drink form or alternatively as a small shooter. The drink is ingested with the immersed scorpion or eaten after the drink is consumed. The freshness and quality of the scorpion is unchanged between preparation and consumption using the disclosed method of storage.

Preparation of the scorpion is carried out before the present method, and involves the aforementioned process of cleaning and cooking the scorpion prior to packaging in the disclosed preservative for distribution. Scorpion exoskeletons molt in accordance with biological cycles, which requires the scorpion to be properly cleaned in the alcohol bath to ensure no loose debris or molted exoskeleton is present in the end product prior to consumption. The scorpion internals are removed, its venomous gland within the tail is removed, and the remaining meat is boiled in alcohol. The result is an edible structure that may be readily consumed with the drink itself, or thereafter once the drink has been consumed.

The preferred embodiment of the syrup for the disclosed method includes several ingredients. These ingredients bolster the look, taste and utility of the syrup. These ingredients include water, high fructose corn syrup, citric acid, sodium citrate and the preservative sodium benzoate. The corn syrup provides the basis for the syrup flavoring, while dyes are added to change the color of the mixture. Mixers contemplated for the preparation of the novelty scorpion drink may include a single shot or full serving drink structure. Mixers ideal for use with the disclosed syrup and edible scorpion include tequila, vodka, clear rum, or non-alcoholic mixers such as soda.

The disclosed invention allows proprietors the ability to order shipments of prepackaged scorpions and drink mix structures without risk to customers or risk of lost product caused from spoilage. The scorpion is prepared in accordance with regulations for human consumption, and the disclosed method of storage allows a preserved scorpion to be available after extended periods of time. Shipments of scorpions without using the disclosed method are at risk to decomposition, spoilage and food poisoning. The disclosed method is a remedy to this problem, and one that is easy to implement.

With respect to the above description then, it is to be realized that the optimum relationships of the invention, to include variations in steps, materials, shape, form, function and manner of operation, assembly and use, are deemed readily apparent and obvious to one skilled in the art, and all equivalent relationships to those described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact operation shown and described, and accordingly, all suitable modifications and equivalents may be resorted to, falling within the scope of the invention.

I claim:

1. A method of stabilizing a scorpion for storage and distribution without refrigeration and for later consumption in novelty drink form, comprising the steps of:

preparing a volume of non-alcoholic preservative syrup comprising flavoring, coloration and sodium benzoate preservative, pouring said non-alcoholic syrup within a container, removing innards and venom sac of said scorpion carcass;

cooking said scorpion carcass;

rinsing said cooked scorpion carcass in an alcohol solution to remove exoskeleton detritus, wherein said alcohol solution is subsequently drained;

placing remaining meat and exo-skeleton of said scorpion carcass in said non-alcoholic syrup, wherein said scorpion carcass meat is ready for human consumption and wherein said non-alcoholic syrup preserves said scorpion carcass for at least twelve months; and sealing said container to prevent air leakage.

2. The method of claim 1, further comprising the steps of:

mixing said non-alcoholic syrup with an alcoholic liquid to create a drink mixture;

serving said drink mixture.

3. The method of claim 2, further comprising the steps of:

serving said scorpion carcass meat along with said drink mixture.

4. The method of claim 1, further comprising the steps of:
mixing said non-alcoholic syrup with soda to create a drink mixture;
serving said drink mixture.

5. The method of claim 4, further comprising the steps of:
serving said scorpion carcass meat along with said drink mixture.

6. The method of claim 1, wherein said syrup has a pH of 3.6 or less.

\* \* \* \* \*